United States Patent [19]

Ernst

[11] 4,253,021
[45] Feb. 24, 1981

[54] INCREMENTAL MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 971,245

[22] Filed: Dec. 20, 1978

[30] Foreign Application Priority Data

Dec. 30, 1977 [DE] Fed. Rep. of Germany ....... 2758854

[51] Int. Cl.$^3$ ............................................. G01B 9/00
[52] U.S. Cl. ............................ 250/231 SE; 250/237 G
[58] Field of Search .................... 250/231 SE, 237 G; 356/395

[56] References Cited

U.S. PATENT DOCUMENTS

| | | |
|---|---|---|
| 2,524,807 | 10/1950 | Kallmann . |
| 2,565,745 | 8/1951 | Shalka . |
| 3,153,111 | 10/1964 | Barber et al. ............... 250/237 G |
| 3,254,226 | 5/1966 | Bobula et al. . |
| 3,757,128 | 9/1973 | Vermeulen ................ 250/237 G X |
| 3,935,447 | 1/1976 | Black et al. ................ 250/231 SEX |
| 3,950,096 | 4/1976 | Aeschlimann et al. . |
| 4,171,160 | 10/1979 | Ernst . |

FOREIGN PATENT DOCUMENTS

| | | |
|---|---|---|
| 1180146 | 5/1957 | Fed. Rep. of Germany . |
| 1177353 | 6/1959 | Fed. Rep. of Germany . |
| 1202012 | 9/1965 | Fed. Rep. of Germany . |
| 2157813 | 5/1973 | Fed. Rep. of Germany . |
| 2448219 | 4/1976 | Fed. Rep. of Germany . |
| 2302512 | 9/1976 | France . |

Primary Examiner—David C. Nelms
Assistant Examiner—Darwin R. Hostetter
Attorney, Agent, or Firm—Hume, Clement, Brinks, Willian & Olds, Ltd.

[57] ABSTRACT

An instrument for measuring the movement of a first object with respect to a second object is disclosed including a rotatable opaque disc mounted on the first object, which disc defines a plurality of translucent involute stripes proceeding from a base circle, a scale including a reflective grid pattern mounted on the second object, and an optical system for projecting an image of a portion of the grid pattern onto an image zone of the disc such that the stripes of the image of the grid are substantially perpendicular to a line drawn tangent to the base circle through the image zone.

24 Claims, 6 Drawing Figures

INCREMENTAL MEASURING INSTRUMENT

BACKGROUND OF THE INVENTION

The present invention relates to an instrument for measuring the displacement or the velocity of an object relative to a reference surface. In general terms, this instrument includes a rotating disc on which is formed an optical, spirally striped pattern, and which is mounted either on the reference surface or to follow the movement of the object. A scale, having an optical pattern of stripes preferably arranged perpendicular to the direction of movement of the object, is mounted either to follow the movement of the object or on the reference surface. By means of an optical arrangement an image of one of the striped patterns is projected onto the other striped pattern, and a photodetector is provided for measuring the light passed by the other striped pattern. Means are provided for generating a reference signal which is applied as an input to a circuit for evaluating the measuring signal provided by the photodetector and comparing it to the reference signal.

In one device of this type known to the art, the optical, spirally striped pattern consists of a long, multiply winding translucent spiral in an otherwise opaque disc (German Pat. No. 1,177,353, FIG. 4). The pitch of the spiral is constant and corresponds to the spacing of straight, parallel bars of the striped pattern of a scale arranged near the disc. In order to properly orient the two striped patterns, at least in a small zone of intersection between the two patterns, the stripes of the pattern on the scale are arranged tangentially to the stripes of the pattern on the disc in the intersection zone and thereby substantially perpendicular to the radius of the disc which passes through the intersection zone. When the scale is stationary with respect to the center of rotation of the disc, the two striped patterns intersect to pass light to a photodetector once with every revolution of the disc. The frequency of the measuring signal given off by the photodetector is therefore equal to the rotation frequency of the disc.

This often results in a relatively low frequency measuring signal, which can be an important disadvantage when circuits are used for evaluating the measuring signal in which the accuracy of the result is substantially proportional to the frequency of the measuring signal. This is often the case, for example, when digital circuits are used to compare the number of wave trains of the measuring signal and of a reference signal. With devices of this type, the disc must be driven at a very high velocity in order to achieve high accuracy, in practice resulting in a device which is often expensive to manufacture.

In another known device of the prior art the stripes of the striped pattern of the disc are radially arranged (German Pat. No. 1,177,353, FIG. 2). A scale with a striped pattern having straight, parallel stripes is arranged near the disk and oriented such that the scale stripes run parallel to a radius of the disc passing through the midpoint of the image zone allocated to the photodetector. Here, the frequency of the measuring signal is a multiple of the frequency of the disc, corresponding to the number of radial stripes, and it is therefore sufficiently high for the previously mentioned circuits for the evaluation of the measuring signal. An important disadvantage here, however, is the fact that a complete match between the stripes of the two striped patterns is not possible, since the radial stripes which do not pass through the center of the image zone form an angle to the parallel stripes of the striped pattern of the scale which increases with distance from the center of the zone. Therefore, when an image zone large enough to produce a sufficiently large measuring signal is used, a measuring signal with a high interference signal constituent is often obtained.

SUMMARY OF THE INVENTION

The present invention is directed to an instrument of the type mentioned at the outset, in which the measuring signal corresponding to the brightness fluctuations of the image zone presents an amplitude and frequency sufficient for the further processing of the signal and in which the interference constituent of the measuring signal is low.

In the instrument of this invention, the stripes of the striped pattern of the disc are arranged in the form of involutes, which proceed from a base circle centered at the pivot point of the disc. Furthermore, the projection of the one striped pattern on the other striped pattern is arranged such that the stripes of the striped pattern of the scale are oriented substantially perpendicular to a tangent passing from the image of these stripes at the disc onto the base circle of the involute stripes of the striped pattern of the disc.

Because the involute stripes of the striped pattern of the disc have the same center of curvature in the image zone the involute stripes can be brought into virtually complete alignment with stripes arranged parallel to one another on the striped pattern of the scale. A striped pattern with a plurality of involute stripes can be arranged on the disk. The frequency of the measuring signal is higher than the frequency of the disk by a factor equal to the number of involute stripes on the disk.

It is particularly advantageous to place the image zone in such a way that the length of the tangent between the base circle and the intersection of the striped patterns is large in the scale of the image in comparison to the length of the stripes of the striped patterns in the image. By reason of the small relative change of radius of curvature between the involute stripes in the image zone, the curvature of these stripes is virtually the same and these stripes can be brought into very good alignment with the stripes of the scale. The stripes of the scale can be formed either as adjacent, like-oriented, slightly curved stripes having a radius of curvature that corresponds to the mean radius of curvature of the involute stripes of the disk, or alternately, as straight, parallel stripes. The latter embodiment is especially simple to produce.

The striped patterns may be formed of alternately translucent and opaque or alternately reflecting and absorbing stripes. By suitably combining translucent or reflecting striped patterns, a measuring device optimally adapted to the particular test geometry can be constructed. For example, a light-reflecting striped pattern is often to be preferred for a scale mounted on the object. The remaining parts of the device can be installed in a housing remote from the object. This is of particular importance in environments in which unfavorable conditions for measuring instruments (such as dirt, refrigerants or lubricants used with machine tools) are found.

The light given off by the image zone comprises equally long periods of light and dark if the stripes of the two striped patterns are equally wide in the projected image. In this case, the measuring signal given off by the detector is suited especially well for evaluation by the circuit.

When the object is set in motion, and thereby one of the two striped patterns, for example the scale pattern, moves with respect to the other, then the measuring signal changes in phase and frequency with respect to the measuring signal corresponding to the object at rest. The frequency change is proportional to the velocity of the object, and the phase displacement is proportional to the interval moved by the object. For the determination of the changes of the measuring signal arising from the movement of the object, the measuring signal is compared with a reference signal. It is possible to obtain a reference signal by scanning a particular optical reference pattern of the disk by means of a detector. This has the advantage that possible fluctuations in the rotational velocity of the disc work out in like manner on the measuring system as on the reference signal and, with suitable evaluation by the circuit, do not influence the measuring result. This approach offers the additional advantage that faults in trueness of rotation of the disc do not cause measuring errors, since the detector providing the measuring signal and the scanning arrangement providing the reference signal can be arranged in exact alignment in the measuring direction.

A special reference pattern becomes unnecessary if the striped pattern of the disc is used as the reference pattern. If it is desired, however, to obtain a reference signal having as high a frequency as possible, then it is advantageous to form the reference pattern as a striped pattern with radially running stripes, since a specially produced reference pattern can be more densely occupied than the involute stripe pattern of the disc, and radially running stripes are especially simple to produce.

In the case of a disc driven at constant velocity the scanning arrangement may be dispensed with if the reference signal is delivered by a function generator, as for example by a quartz-stablized multivibrator.

The circuit for evaluating the reference signal and the measuring signal can be executed in such a way that the circuit includes a up-down counter for the formation of a digital value representing the displacement of the object, which counter adds and subtracts signals derived from the measuring signal and the reference signal. This circuit can be constructed simply to deliver a digital value representing the displacement of the body, which signal is very well suited for further processing in data processing installations such as machine tool controls.

The accuracy of the measurement is increased if the up-down counter is used to count very high frequency signals derived from the measuring signal and the reference signal. This is achieved by the means that the circuit includes at least one subdivider that delivers an output signal with a frequency greater by a prescribed factor than an input signal.

In a second embodiment of the invention, the rotating disc may be driven at a rotational velocity regulated in such a manner that the frequency of the measuring signal is held constant instead of the rotational velocity of the disc.

In this case it is the reference signal indicative of disc velocity which is evaluated to determine the position or velocity of the object. In that the reference pattern may be formed with closely spaced stripes, this embodiment may produce a high frequency measurement signal suitable for processing in the evaluating circuit.

The invention, together with further objects and attendant advantages, will be best understood by reference to the following detailed description taken in the conjunction with the appended drawings.

DETAILED DESCRIPTION OF PREFERRED EMBODIMENTS

Figures 1, 2:
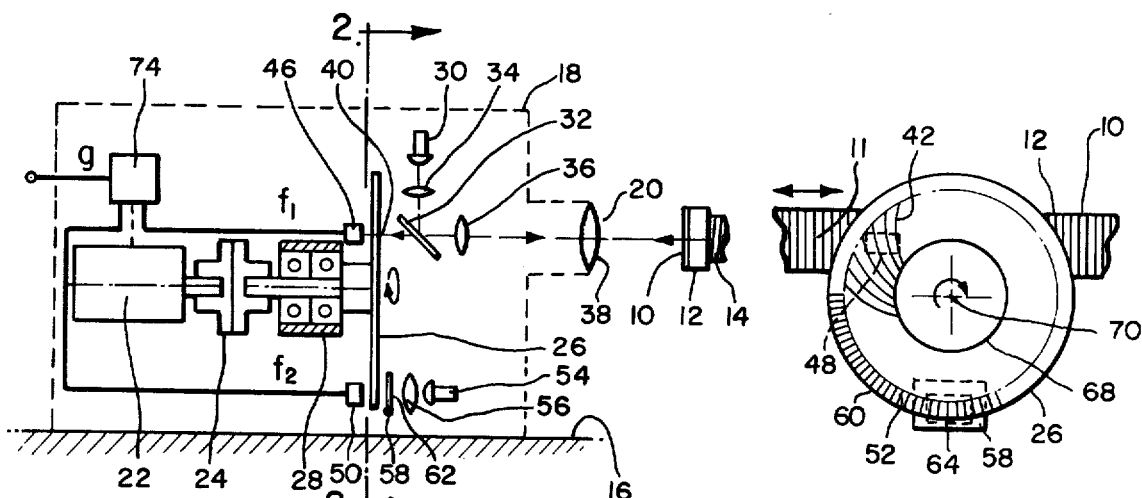
FIG. 1 is a schematic representation in section of the mechanical-optical construction of a preferred embodiment of the instrument of the invention.
FIG. 2 is a sectional view taken along the II—II of FIG. 1 with the casing and the illuminating system omitted showing a first preferred embodiment of the disc.

Referring now to the drawings, FIG. 1 shows a scale 12 provided with a striped pattern 10 of alternately reflecting and light-absorbing stripes 11, which is connected to an object 14, the movement of which is to be measured relative to a reference surface 16. For this, a casing 18 is set up at a distance from this scale 12 on the reference surface 16, which casing seals off the components necessary for the measurement in a dust tight manner. The casing also seals out external light except for that which enter through a measuring opening 20, and protects these components from mechanical damage. Inside the casing 18 a disc 26 is rotatably mounted, driven by a motor 22 by means of a coupling 24. The disc 26 is mounted free of play on a ball bearing or roller bearing 28. Inside the casing 18 there is arranged a first light source 30, preferably a semiconductor light source, which by means of a partially reflective mirror 32 and a system of lenses generates an image 40 of the striped pattern 10 of the scale 12 on the disc 26. For this the light source 30 is projected via a condenser lens 34 and the partially reflective mirror 32 onto a lens 36. The lens 36 is located in the focus of a field lens 38 mounted in the measuring opening 20, which projects the light source 30 into infinity and therefore illuminates the striped pattern 10 uniformly. Lens 36 and field lens 38 are arranged so that the stripes 11 are sharply projected onto the disc 26. They form there the stripes 11' of the image 40. Since the disc 26 has a striped pattern 42 (as described below) of alternately translucent and opaque stripes 44, light from the image 40 of the striped pattern 10 of the scale 12 can pass through the disc 26 and be measured by a photosensitive detector 46. Since the disc 26 rotates, there is obtained with object 14 at rest a measuring signal $f_1$ with alternating amplitude corresponding to the alternating mutual covering over of the two striped patterns 40 and 42. In FIG. 2 there is seen the disc 26 from the side of the detector 46. The image 40 of the striped pattern 10 of the scale 12 projected onto the other side of the disc 26 is indicated with a broken contour line 48. The light coming from the zone enclosed by this contour line 48 is received by the detector 46. For the formation of a reference signal $f_2$ independent of the movement of the object 14, there is arranged a second detector 50 behind the disc 26, which detector 50 scans a uniformly illuminated reference pattern 52 of the disc 26. For this the reference pattern 52 is illuminated by a second light source 54 via a condenser lens 56. Between light source 54 and detector 50 there is arranged a diaphragm 58, which has either a single diaphragm opening of the width of stripes 60 of the reference pattern 52, or has a striped pattern 56 corresponding to the reference pattern 52. The diaphragm 58 as well as the zone of the reference pattern 52 illuminated through the stripe pattern 62 of the diaphragm are shown in FIG. 2. This zone is indicated by the broken contour line 64.

Figures 3, 4:
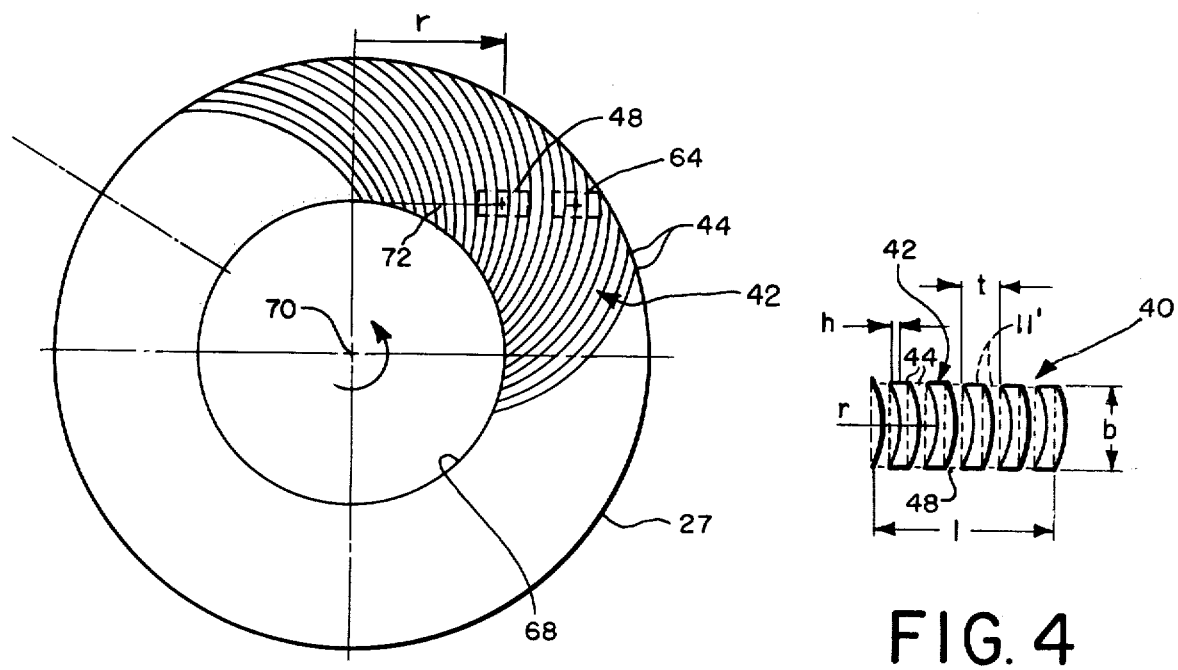
FIG. 3 is a plan view of second preferred embodiment of the disc.
FIG. 4 is a partial plan view of the discs of FIG. 2 or FIG. 3.

The striped pattern 10 of the scale 12 is composed of reflecting and light-absorbing stripes 11 of equal width of, for example, 0.5 mm, i.e. of a period of 1 mm. A rectangular field, for example 11×25 mm in size, of the striped pattern 10 is projected as image 40 onto the disc 26 in the zone bounded by the contour line 48. The lens system of lens 36 and field lens 20 has a projection ratio of 1:5.5, and the image 40 therefore has a length 1 of 4.5 mm and a width b of 2 mm. In FIG. 4 dotted lines are used to indicate some of the projected stripes 11' of the striped pattern 10 in the image 40. The period of these projected stripes is 0.18 mm. The stripes 11' are projected onto the involute stripes 44 of the striped pattern 42 of the disc 26. This is represented in FIG. 4, in which the curvature of the stripes 44 is exaggerated for the clarification of the drawing. The radius of curvature r of the stripes 44 is a function of the position of the image 40 on the disc 26. FIG. 3 shows a disc 27 in which the striped pattern 42 serves also as reference pattern, which is indicated by the contour line 64 inside the involute stripe pattern 42. In correspondence to FIGS. 1 and 2 the detector 50 scans the zone of disc 27 bounded by this contour line 64.

The stripes 42 follow involutes that describe the curves defined by the ends of different-length threads in winding off from a base circle 68. The radius of curvature of a point on an involute, for example, inside the contour line 48 of FIG. 3, is, therefore, the length of the line 72 tangent to the base circle 68, between the point on the involute and the base circle 68. The base circle 68 is centered in the pivot point 70 of the disc 27. The stripes 44 are slightly arched with an arching height h, which should preferably be small with respect to the period t. This is achieved by the means that the radius of curvature r is chosen large with respect to the width b. The magnitude of the arching height h is given by the relation $$h = b^2/8r$$

Thus, with a radius of curvature r, of, for example, 25 mm and a width b of 2 mm, an arching height h of 0.02 mm is obtained.

Since the tangent 72 is simultaneously radial for the stripes 44, the object 11 of the striped pattern 10 are projected into the image 40 in such a way that they stand perpendicular to the tangent 72. They are then oriented the same as the stripes 44 and give a sharp covering off of the two patterns 40 and 42.

Figure 5:
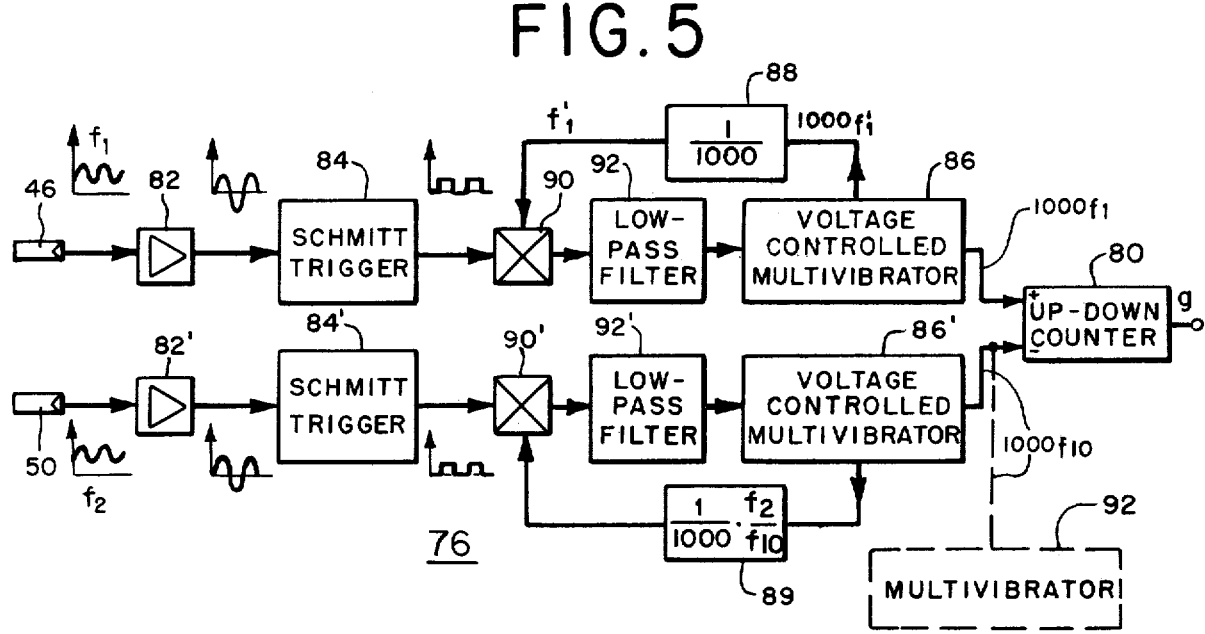
FIG. 5 is a schematic circuit drawing showing a first preferred embodiment of a circuit for evaluating a reference signal and a measuring signal.
Figure 6:
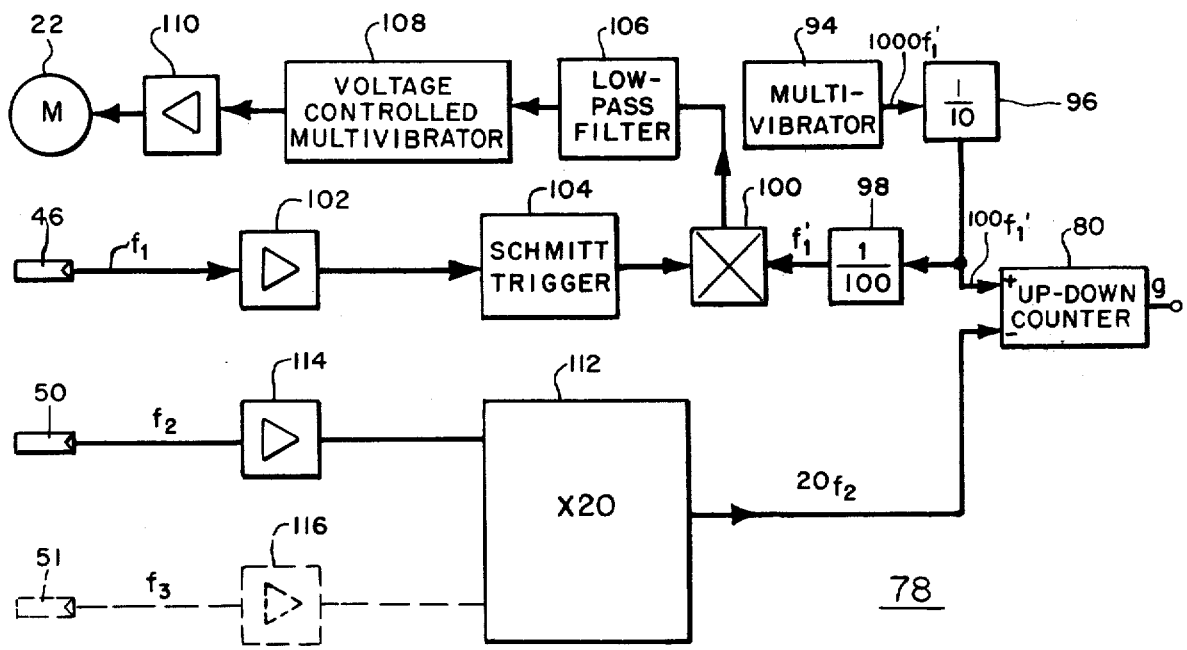
FIG. 6 is a schematic circuit drawing of a second preferred embodiment of a circuit for evaluating a reference signal and a measuring signal.

The signals $f_1$ and $f_2$ generated by the detectors 46 and 50, respectively, are fed to a circuit 74 (FIG. 1) which generates a reference signal g representing the displacement of the body 14. This signal can be fed to a display device or to a control, for example a machine tool control (not represented in FIG. 1). In FIGS. 5 and 6 there are shown two preferred embodiments 76 and 78 of the circuit 74. Both embodiments 76 and 78 include an up-down counter 80, which adds rectangular pulses derived from the signal $f_1$ and substracts from them rectangular pulses obtained from the signal $f_2$. In order to improve the accuracy of this result, these rectangular (square) pulses have in each case a frequency greater by a prescribed factor than the signals $f_1$ and $f_2$.

These high frequency rectangular pulses are obtained in the first embodiment 76 in the following manner. The signal $f_1$ is fed to an alternating voltage amplifier 82 and thereupon to a Schmitt trigger stage 84, which generate sinusoidal or rectangular pulses, respectively, of the same frequency as $f_1$.

Simultaneously a voltage-controlled multivibrator 86 generates a rectangular signal with a frequency $1000 \times f_1'$. This signal is transformed by a divider 88 into a rectangular signal of the frequency $f_1'$. A multiplier 90 forms the product of $f_1$ and $f_1'$ and feeds this to a low pass filter 92, which generates from this a direct current signal. This direct current signal is different from zero in the event that $f_1$ and $f_1'$ are not identical with like phase position and regulates the voltage-controlled multivibrator 86 in such a manner that any phase deviation between the signals $f_1$ and $f_1'$ is eliminated. The multivibrator 86 thereby provides an output signal with a frequency of $1000 \times f_1$.

In like manner, a signal with the frequency of $1000 \times f_2$ is obtained from the signal $f_2$. If a reference pattern is used with a spatial frequency that differs from that of the involute striped pattern 42, a second frequency $f_{10}$ must be obtained from the frequency $f_2$ which is identical with the frequency $f_1$ then the object 14 is at rest. In this embodiment divider 89 is provided, which forms a signal having the frequency $(1/1000) \cdot (f_2 f_{10})$. The remaining components necessary for the formation of the signal $1000 \times f_{10}$ from the signal $f_2$ are the same as those already discussed for the evaluation of the signal $f_1$ and are therefore designated with the same reference figures, but primed.

Through the described embodiment 76 of the circuit 74 there is achieved a subdivision by the factor of a thousand, i.e., a subdivision of the striped pattern 10 with a period of 1 mm to a period of 0.001 mm. Other subdivision factors are possible with analogous applications of the principles described.

If the rotation frequency of the disc 26 or 27 is sufficiently constant for the desired measurement precision, then the reference signal can be taken as signal $f_2$ from a multivibrator 92 with the frequency $1000 f_{10}$ instead of from detector 50, and can be fed to the updown counter 80, as shown in FIG. 5 with broken lines.

The frequency of the signal $f_1$, $f_2$ which is not maintained constant should be as high as possible, so that the demands on the low-pass filter 92 and 92' of the particular subdivider circuit 86, 88, 90, 92 or 86', 88', 90', 92' can be kept low. Since the reference pattern can be made with a very high number of stripes as a radial striped pattern 52 lying on the outer edge of the disc, it is advantageous to regulate the frequency of the disc 26, 27 in such a way that the measuring signal $f_1$ is constant and the frequency of signal $f_2$ varies in correspondence to the movement of the object 14. The subdivider circuit 86, 88, 90, 92 for the lower frequency $f_1$, therefore, can be dispensed with and the constant signal $f_1$ can be derived from a multivibrator. The lowpass filter 92' for the high frequency $f_2$ can be simply constructed.

The circuit arrangement for the realization of this measuring approach is shown in FIG. 6 as second preferred embodiment 78. The motor 22 is here regulated in such a way that the measuring signal $f_1$ becomes equal to a prescribed constant signal $f_1'$. This constant signal $f_1'$ is derived from a multivibrator 94, which delivers a signal 1000 $f_1'$. From the signal 1000 $f_1'$ there is formed with the aid of two subdividers 96 and 98 the signal $f_1'$ and it is fed to a multiplier 100. Simultaneously there is fed to the multiplier 100 the signal $f_1$ processed by an amplifier 102 and a Schmitt trigger stage 104 coupled to the output of the amplifier 102. The output signal of the multiplier 100 conducted through a low-pass filter 106 regulates a voltage-controlled multivibrator 108, which, via an amplifier 110, drives the motor 22 of the disc 26, 27. The motor 22 is regulated in such a way that the deviations between signal $f_1$ and $f_1'$ are eliminated. The signal 100 $f_1'$ (or, if need be, 1000 $f_1'$ corresponding to FIG. 5) is fed to the up-down counter 80.

The signal $f_2$ can be subdivided by a large factor, as in the embodiment of FIG. 5. In the event that a lower accuracy is sufficient, the signal $f_2$ can be subdivided by a smaller factor. In FIG. 6 there is shown twenty-fold subdividing divider 112 constructed as a simple network. To it there is fed the signal $f_2$ as amplified by an amplifier 114. Here, a third signal $f_3$ phase-shifted by 90° with respect to signal $f_2$ is used. Signal $f_3$ is provided by a dertector 51 which scans the reference pattern 52 and is amplified by an amplifier 116 (broken line in FIG. 6). The output signal $20 \times f_2$ of the divider 112 is fed to the up-down counter 80.

For the measurement of large displacements of the object 14 the scale 12 is preferably composed of several sequents of, for example, 250 mm in length each. The production of individual segments is cheaper than the production of a whole scale 12. For economy of production it is also advantageous that the period of the striped pattern 10 be relatively great. If greater precisions are required, then a continous, precisely manufactured scale 12 can be used. While the preceding embodiments utilize the signals $f_1$ and $f_2$ provided by the detectors 46, 50 to measure the displacement of the object 14, it should be understood that a comparison of the frequencies of $f_1$ and $f_2$ can be made to determine the instantaneous velocity of the object 14. The device described herein is economical to manufacture and simple in construction, and it makes possible a reliable, accurate measurement of the movement of the object 14.

Of course, it should be understood that various modifications and changes to the preferred embodiments described herein will be apparent to those skilled in the art. Such modifications and changes can be made without departing from the spirit and scope of the present invention. It is, therefore, intended that such changes and modifications be covered by the following claims.

I claim:

1. In an instrument for measuring the movement of a first object with respect to a second object along a measuring direction, said instrument including first means, mounted on the first object, for defining a rotatable first pattern of spirally formed stripes, second means mounted on the second object, for defining a second pattern of stripes oriented substantially perpendicularly to the measuring direction, means for generating an optical image of one of said patterns on the other of said patterns at an image zone, means for generating a measurement signal representative of the intensity of light given off from said other pattern, means for generating a reference signal, and means for evaluating the measurement signal in comparison with the reference signal, the improvement comprising:

the stripes of the rotatable spirally striped pattern are formed substantially in the form of involutes proceeding from a base circle centered at the center of rotation of the spirally striped pattern; and said means for generating an optical image includes means for orienting the stripes of the second pattern substantially perpendicular to a line tangent to the base circle passing through the image zone;

said means for generating an optical image operating to generate a reduced image of said one pattern on said other pattern.

2. The instrument of claim 1 wherein the length of the tangent line between the base circle and the image zone is substantially greater than the length of the stripes in the image zone.

3. The instrument of claim 1 or 2 wherein at least one of said first and second patterns is formed of alternating translucent and opaque regions.

4. The instrument of claim 1 or 2 wherein at least one of said first and second patterns is formed of alternating reflecting and absorbing regions.

5. The instrument of claim 1 or 2 wherein stripes of the first and second patterns are equally wide in the image zone.

6. The instrument of claim 1 or 2 wherein the first means includes means for forming an optical reference pattern which rotates at the same rate as the first pattern and the means for generating a reference signal includes means for optically scanning the optical reference pattern.

7. The instrument of claim 6 wherein the optical reference pattern is formed by the first pattern.

8. The instrument of claim 6 wherein the optical reference pattern comprises a pattern of radial stripes.

9. The instrument of claim 1 wherein the first means includes means for rotating the first pattern at a substantially constant velocity and the reference signal is a periodic signal generated by a function generator.

10. The instrument of claim 1 wherein the evaluating means includes counting means for storing a count, means for incrementing the count in response to the measurement signal, and means for decrementing the count in response to the reference signal.

11. The instrument of claim 10 wherein the incrementing means increments the count at a frequency greater than the frequency of the measuring signal by a prescribed factor.

12. The instrument of claim 1 wherein the first means includes means, responsive to the measuring signal, for rotating the first pattern at a velocity such that the measuring signal is maintained substantially constant for a range of velocities of the first object with respect to the second object.

13. An instrument for optically measuring the movement of a first object with respect to a second object along a measuring direction, said instrument comprising:

a disc defining a first pattern including a plurality of involute shaped stripes, each of which proceeds from a base circle centered at a rotation point;

means for rotatably mounted the disc to the first object such that the disc is rotatable about the rotation point;

a scale defining a second pattern including a plurality of stripes;

means for mounting the scale to the second object such that the plurality of stripes are substantially perpendicular to the measuring direction;

means for generating a reduced optical image of one of said patterns on the other of said patterns at an image zone;

means for generating a measurement signal representative of the intensity of light given off from at least a portion of said image zone;

means for generating a reference signal; and means for evaluating the measurement signal in comparison with the reference signal.

14. The instrument of claim 13 wherein the length of the tangent line between the base circle and the image zone is substantially greater than the length of the stripes in the image zone.

15. The instrument of claim 12 or 13 wherein at least one of the first and second patterns is formed of alternating translucent and opaque regions.

16. The instrument of claim 13 or 14 wherein at least one of the first and second patterns is formed of alternating reflecting and absorbing regions.

17. The instrument of claim 13 or 14 wherein stripes of the first and second patterns are equally wide in the image zone.

18. The instrument of claim 13 or 14 wherein the disc includes means for forming an optical reference pattern which rotates at the same rate as the first pattern, and the means for generating a reference signal includes means for optically scanning the optical reference pattern.

19. The instrument of claim 18 wherein the optical reference pattern is formed by the first pattern.

20. The instrument of claim 18 wherein the optical reference pattern comprises a pattern of radial stripes.

21. The instrument of claim 13 wherein the means for rotatably mounting the disc includes means for rotating the disc at a substantially constant velocity, and the means for generating a reference signal includes a function generator operative to generate a periodic reference signal.

22. The instrument of claim 13 wherein the evaluating means includes counting means for storing a count, means for incrementing the count in response to the measurement signal, and means for decrementing the count in response to the reference signal.

23. The instrument of claim 22 wherein the incrementing means is operative to increment the count at a frequency greater than the frequency of the measuring signal by a pre-selected factor.

24. The instrument of claim 13 wherein the means for rotatably mounting the disc includes means for adjusting the rotational velocity of the disc such that the frequency of the measuring signal is maintained at a substantially constant value for a range of velocities of the first object with respect to the second object.

* * * * *